W. F. JARRETT.
WAGON WHEEL.
APPLICATION FILED SEPT. 10, 1914.
1,155,154.
Patented Sept. 28, 1915.
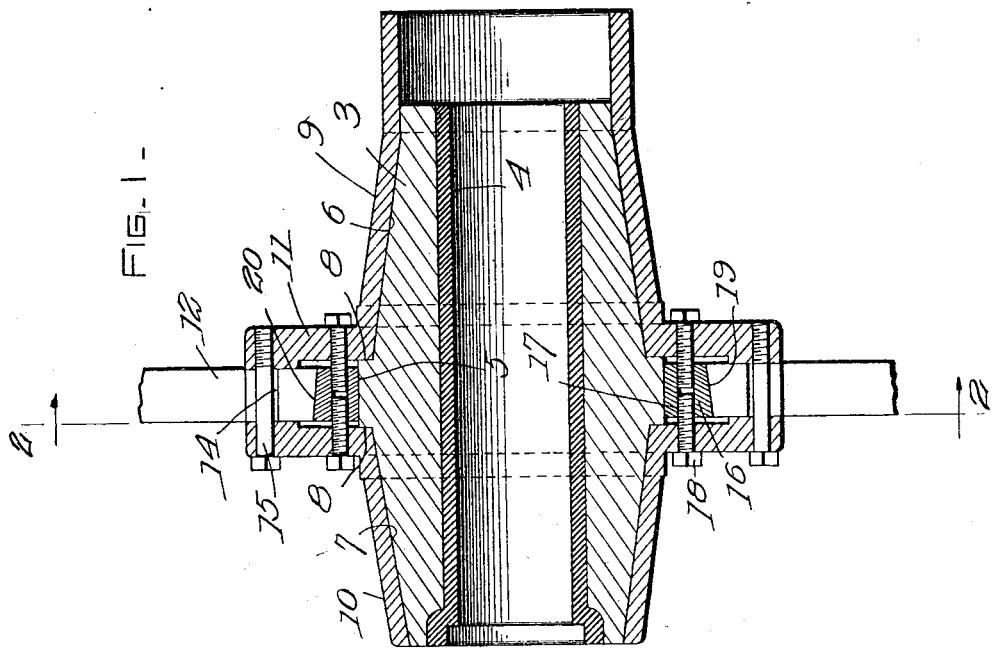
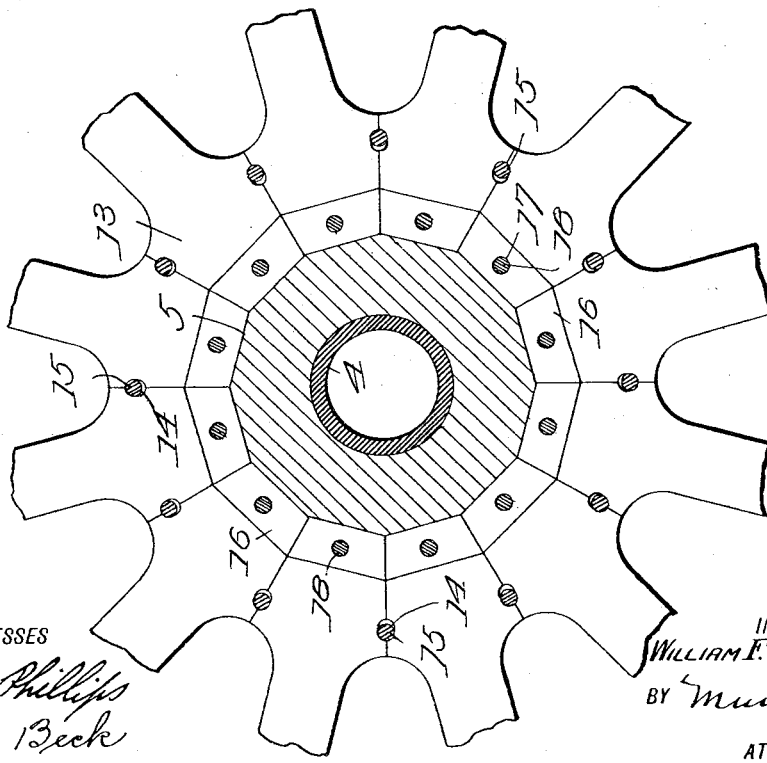
WITNESSES
J. V. Phillips
H. E. Beck
INVENTOR
William F. Jarrett
BY Munn & Co.
ATTORNEYS

UNITED STATES PATENT OFFICE.

WILLIAM FRANKLIN JARRETT, OF CARL JUNCTION, MISSOURI.

WAGON-WHEEL.

1,155,154.　　　Specification of Letters Patent.　　Patented Sept. 28, 1915.

Application filed September 10, 1914. Serial No. 861,030.

*To all whom it may concern:*

Be it known that I, WILLIAM F. JARRETT, a citizen of the United States, and a resident of Carl Junction, in the county of Jasper and State of Missouri, have invented a new and useful Improvement in Wagon-Wheels, of which the following is a specification.

This invention relates to vehicle wheels and more particularly to that class which are formed with wooden spokes and rims which are therefore subject to atmospheric conditions and affected or influenced thereby.

The object of the present invention is to provide a wagon wheel in which the spokes may be tightened from time to time as circumstances may necessitate.

A further object is to accomplish the aforementioned end in a novel and expeditious manner whereby the structures involved will be of a simple nature and thus subject to cheap and economic manufacture.

A further object is to improve generally and enhance the utility of articles of that class to which the present invention appertains.

With the foregoing and other objects in view which will appear as the description proceeds, the invention resides in the combination and arrangements of parts and in the details of construction hereinafter described and claimed, it being understood that changes in the precise embodiment of the invention herein disclosed, can be made within the scope of what is claimed without departing from the spirit of the invention.

In the drawings accompanying this specification and forming a part thereof, the preferred embodiment of my invention is illustrated, in which:—

Figure 1 is a view in longitudinal section of a wheel hub and adjacent portions of the spokes, embodying the features of my invention, and Fig. 2 is a cross sectional view taken on the line 2—2 of Fig. 1.

Referring to the drawings in which similar reference numerals designate corresponding parts throughout the several views, the body 3 of the wheel hub is provided with the usual bushing 4 extending therethrough which is adapted to engage a vehicle axle for the rotatable support of the wheel. The body 3 is provided with a polygonal central portion 5 from which diverge the conical surfaces 6 and 7.

The juncture between the polygonal portion 5 and the diverging conical portions 6 and 7 define radial ledges 8 against which the tapered sleeves 9 and 10 are adapted to contact. The conical or tapered sleeves include the centrally disposed outstanding annular flanges 11 which embrace the inner extremities of the spokes 12 therebetween. The spokes are provided with the enlarged heads 13 through which the elongated apertures 14 extend, thus slidably receiving the bolts 15 therethrough which latter extend between and engage the annular flanges 11 and draw the same together for the rigid engagement of the hub body portion 3.

A plurality of independent wedge shaped blocks 16 are slidably mounted between the annular flanges and are provided with threaded apertures 17 extending therethrough with which the draw bolts 18 engage, the said bolts being thus adapted to move the wedge shaped blocks 16 and to lock the same in adjusted position. The blocks are provided with beveled outer surfaces 19 which bear against the inner beveled ends 20 of the spokes and effect a sliding contact therewith. The blocks 16 are substantially trapezoidal in contour as illustrated in Fig. 2, and form a continuous ring completely encompassing the polygonal portion 5 of the hub body.

The blocks being relatively less in thickness than the space defined between the flanges 11 provides that they may be shifted therein, through the instrumentality of the bolts 18 to thus independently tighten the spokes to any desired degree. Thus should any spoke or spokes become loose or the tire separated from the rim the moving of the wedge blocks will effect a quick and efficient remedy and without necessitating the aid of a skilled blacksmith in so doing. On the other hand should the wheel become dished or warped due to the excessive pressure of the spokes upon the rim this may be also quickly corrected by moving the wedge shaped blocks in the opposite direction allowing for the retraction or movement of the spokes toward the hub body 3. The oppositely tapering sleeves 9 and 10 are adapted to rigidly engage and reinforce the hub body 3 and thus make up an extremely strong and rigid and substantially unitary hub. A broken spoke may be quickly replaced by removing the anchor bolts 15 and adjusting bolts 19 and removing the sleeve 9. The broken spoke may then be removed and the new spoke substituted therefor which may be subsequently tightened and rigidly held in place by replacing the sleeve 9 and the proper adjustment of the wedge shaped block upon which the lower extremity of the new spoke rests.

Having thus defined my invention and delineated several of its advantages, what I claim is:—

1. A wheel hub comprising a body portion having a polygonal portion intermediate its ends, a pair of sleeves engaging the ends of said body and being provided with outstanding annular flanges adjacent the polygonal portions, means connecting the flanges and adapted to anchor the sleeves in position, a plurality of contacting wedge members slidably mounted between the flanges and adjacent entirely around the surfaces of the polygonal portions between those flanges circumferentially of the hub, a plurality of spokes with beveled extremities contacting each with one of the wedge members and extending between the flanges, and oppositely extending bolts projecting through the flanges and engaging the wedge members for the rigid adjustment of said wedge members and the forced extension of said spokes.

2. A wheel comprising a hub body with oppositely tapering ends and a polygonal central portion, a pair of oppositely tapered sleeves engaging the tapering portions of said hub body and provided with annular flanges at their adjacent extremities, a plurality of spokes extending from said hub body polygonal portion, said spokes provided with beveled lower extremities and with slotted apertures spaced a distance therefrom, a plurality of anchor bolts extending between said flanges and projecting through said slotted apertures, a plurality of wedge shaped blocks slidably mounted between said flanges and provided with outer beveled surfaces contacting with the beveled extremities of said spokes, and oppositely extending adjusting bolts projecting through said flanges and threadedly engaging said blocks for the forced adjustment thereof.

WILLIAM FRANKLIN JARRETT.

Witnesses:
Hugh Dobbs,
Viola J. Goodman.

Copies of this patent may be obtained for five cents each, by addressing the "Commissioner of Patents, Washington, D. C."